(12) United States Patent
Howard et al.

(10) Patent No.: US 7,298,137 B2
(45) Date of Patent: Nov. 20, 2007

(54) POSITION SENSING APPARATUS AND METHOD

(75) Inventors: Mark Anthony Howard, Worlington (GB); Colin Stuart Sills, Cambridge (GB); Darran Kreit, Foxton (GB); David Alun James, Harston (GB)

(73) Assignee: TT Electronics Technology Limited (GB)

( * ) Notice: Subject to any disclaimer, the term of this patent is extended or adjusted under 35 U.S.C. 154(b) by 0 days.

(21) Appl. No.: 10/531,499

(22) PCT Filed: Oct. 16, 2003

(86) PCT No.: PCT/GB03/04504

§ 371 (c)(1),
(2), (4) Date: Nov. 18, 2005

(87) PCT Pub. No.: WO2004/036147

PCT Pub. Date: Apr. 29, 2004

(65) Prior Publication Data

US 2006/0125472 A1 Jun. 15, 2006

(30) Foreign Application Priority Data

Oct. 16, 2002 (GB) .................................. 0224090.1
Apr. 9, 2003 (GB) .................................. 0308257.5

(51) Int. Cl.
*G01B 7/14* (2006.01)
(52) U.S. Cl. .............................. 324/207.24; 324/207.17
(58) Field of Classification Search ........... 324/207.11, 324/207.15, 207.16, 207.17, 207.18, 207.19, 324/207.23, 207.24, 207.25, 207.26
See application file for complete search history.

(56) References Cited

U.S. PATENT DOCUMENTS

| | | |
|---|---|---|
| 3,275,938 A | 9/1966 | Carsello et al. |
| 3,772,587 A | 11/1973 | Farrand et al. |
| 3,789,393 A | 1/1974 | Tripp |
| 3,819,025 A | 6/1974 | Fushida et al. |
| 4,253,079 A | 2/1981 | Brosh |
| 4,282,485 A | 8/1981 | Pauwels et al. |

(Continued)

FOREIGN PATENT DOCUMENTS

DE 4230950 9/1993

(Continued)

OTHER PUBLICATIONS

Howard et al., "Sensing Position", Mar. 27, 2001, Publisher: Appliance Manufacturer.

(Continued)

*Primary Examiner*—Reena Aurora
*Assistant Examiner*—David M Schindler
(74) *Attorney, Agent, or Firm*—Fogg & Powers LLC

(57) ABSTRACT

There is described an inductive position sensor in which a signal generator applies a excitation signal to an excitation winding formed on a first member, the excitation winding being electromagnetically coupled to at least two resonant circuits formed on a second member which are spaced from each other along a measurement path. The excitation windings are shaped so that the electromagnetic coupling between the exciting winding and each of the resonators varies along the measurement path. In this way, by applying an excitation signal to the excitation winding, respective different signals are induced in the resonators which depend upon the relative position of the first and second members.

11 Claims, 6 Drawing Sheets

U.S. PATENT DOCUMENTS

| | | |
|---|---|---|
| 4,467,320 A | 8/1984 | McPhee |
| 4,671,116 A | 6/1987 | Glennon et al. |
| 4,697,144 A | 9/1987 | Howbrook |
| 4,737,698 A | 4/1988 | McMullin et al. |
| 4,816,759 A * | 3/1989 | Ames et al. ............ 324/207.17 |
| 4,853,666 A | 8/1989 | Fesenmeier et al. |
| 4,893,077 A | 1/1990 | Auchterlonie |
| 4,893,078 A | 1/1990 | Auchterlonie |
| 4,959,631 A | 9/1990 | Hasegawa et al. |
| 4,970,450 A | 11/1990 | Karl et al. |
| 5,023,408 A | 6/1991 | Murakami et al. |
| 5,173,696 A | 12/1992 | Howard et al. |
| 5,260,650 A | 11/1993 | Schwesig et al. |
| 5,433,115 A | 7/1995 | Spillman, Jr. et al. |
| 5,513,913 A | 5/1996 | Ball et al. |
| 5,598,153 A | 1/1997 | Brasseur et al. |
| 5,625,327 A | 4/1997 | Carroll et al. |
| 5,646,496 A | 7/1997 | Woodland et al. |
| 5,793,202 A | 8/1998 | Ikemoto |
| 5,793,204 A | 8/1998 | Logue |
| 5,796,250 A | 8/1998 | Dames |
| 5,815,091 A | 9/1998 | Dames et al. |
| 5,986,549 A * | 11/1999 | Teodorescu ................. 340/561 |
| 6,124,708 A | 9/2000 | Dames |
| 6,239,571 B1 | 5/2001 | Shimahara |
| 6,304,014 B1 | 10/2001 | England et al. |
| 6,489,899 B1 | 12/2002 | Ely et al. |
| 2005/0030010 A1 | 2/2005 | Jones et al. |
| 2005/0035836 A1 | 2/2005 | Howard et al. |

FOREIGN PATENT DOCUMENTS

| | | |
|---|---|---|
| EP | 0487730 | 6/1992 |
| EP | 0748054 | 12/1996 |
| EP | 0772025 | 5/1997 |
| GB | 2021273 | 11/1979 |
| GB | 2044461 | 10/1980 |
| GB | 2197078 | 5/1988 |
| JP | 57122311 | 7/1982 |
| JP | 63218819 | 9/1988 |
| SU | 1458946 | 2/1989 |
| WO | 9800921 | 1/1998 |
| WO | 9843046 | 10/1998 |
| WO | 9934171 | 7/1999 |
| WO | 9961868 | 12/1999 |
| WO | 0033244 | 6/2000 |
| WO | WO 00 77480 | 12/2000 |
| WO | 0129759 | 4/2001 |
| WO | 0142865 | 6/2001 |

OTHER PUBLICATIONS

Howard, "Innovative Interfaces", Oct. 26, 2001, Publisher: Appliance Manufacturer.

Novacek, "Accurate Linear Measurement Using LVDTS", "Circuit Cellar the Computer Applications Journal", May 1, 1999, pp. 1-6, vol. 106, Publisher: Circuit Cellar.

* cited by examiner

US 7,298,137 B2

POSITION SENSING APPARATUS AND METHOD

This application claims priority to International Patent Application No. PCT/GB2003/004504 filed on Oct. 16, 2003 that claims priority to Great Britain Patent Application No. 0224090.1 filed on Oct. 16, 2002 and claims priority to Great Britain Patent Application No. 0308257.5 filed on Apr. 9, 2003.

This invention relates to a sensing apparatus and method, in particular for sensing the relative position of two members.

Various forms of inductive sensor have been used to generate signals indicative of the position of two relatively movable members. For example, UK Patent Application No. 2374424 describes a position sensor in which two excitation windings and a sensor winding are formed on a first member, and a resonant circuit is formed on a second member. The two excitation windings are shaped so that the electromagnetic coupling between the excitation windings and the resonant circuit varies along a measurement path in accordance with a sine function and a cosine function respectively. By applying an in-phase oscillating signal and a quadrature oscillating signal (that is 90° out of phase with the in-phase oscillating signal) to the first and second excitation windings respectively, an oscillating signal is generated in the resonant circuit whose phase is dependent upon the relative position between the first and second members along the measurement path. The oscillating signal in the resonant circuit in turn induces an oscillating signal in the sensor winding whose phase is indicative of the relative position between the first and second members along the measurement path.

A problem with the position sensor described in GB 2374424A is that the drive circuitry which applies the quadrature pair of excitation signals to the two excitation windings is relatively complex.

According to an aspect of the invention, there is provided a position sensor in which a signal generator applies an excitation signal to an excitation winding formed on a first member, wherein the excitation winding is electromagnetically coupled to at least two resonant circuits formed on a second member which are spaced from each other along a measurement path. The excitation windings are shaped so that the electromagnetic coupling between the excitation winding and each of the resonators varies along the measurement path. In this way, by applying an excitation signal to the excitation winding, respective different signals are induced in the resonators which depend upon the relative position of the first and second members.

An exemplary embodiment of the present invention will now be described with reference to the accompanying drawings in which:

FIG. 1 schematically shows a perspective view of a position sensor;

FIG. 2 schematically shows the main components of the position sensor illustrated in FIG. 1;

FIG. 3 schematically shows how the respective phases of signals induced in two resonant circuits which form part of the position sensor illustrated in FIG. 1 vary with the frequency of a driving signal;

Figure 1:
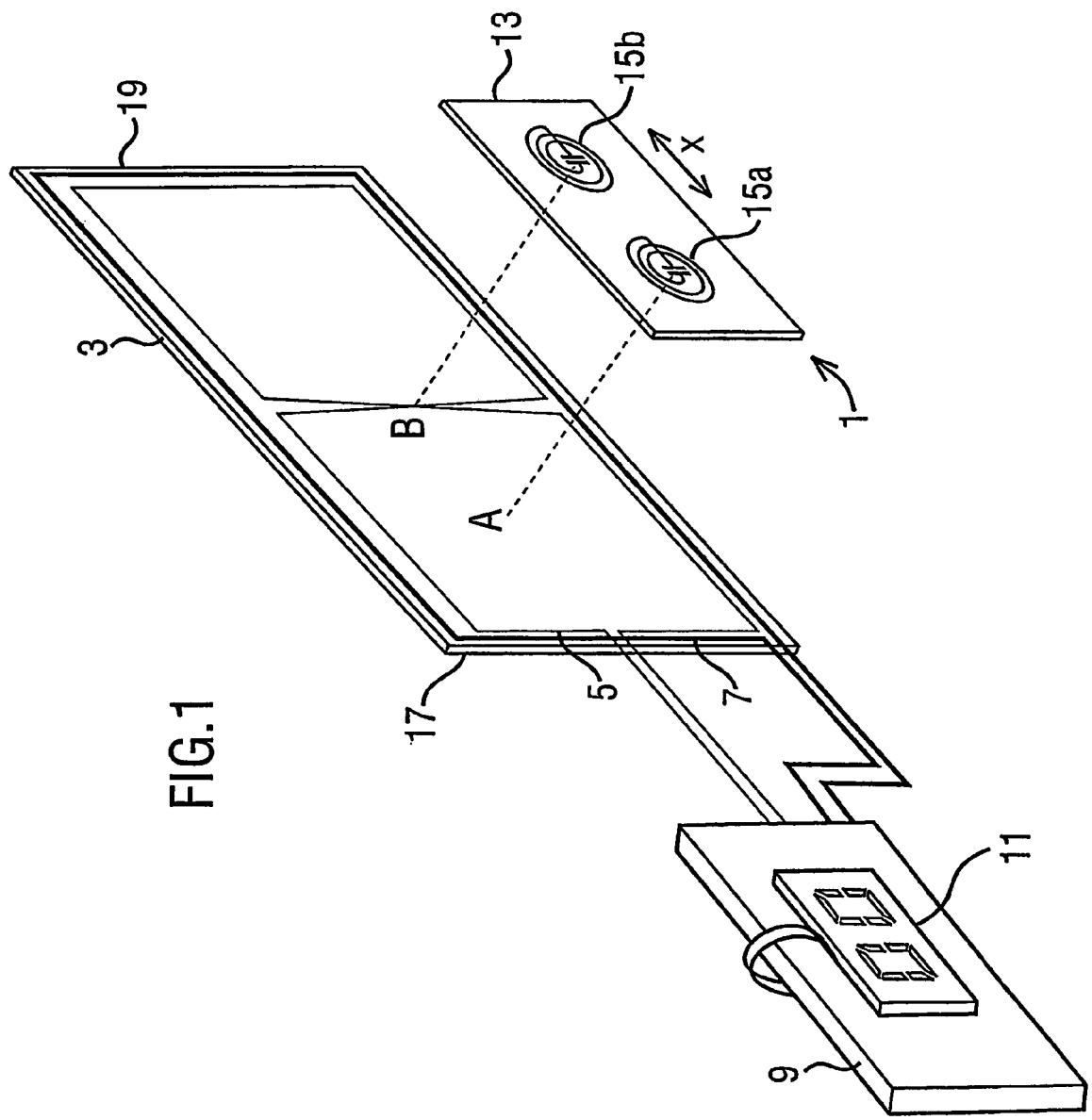

FIG. 1 schematically shows a position sensor for detecting the position of a sensor element 1 which is slidably mounted to a support (not shown) to allow linear movement along a measurement direction (the direction X in FIG. 1). A printed circuit board (PCB) 3 extends along the measurement direction and has printed thereon conductive tracks which form a sine coil 5 and a sense coil 7, each of which are connected to a control unit 9. A display 11 is also connected to the control unit 9 for displaying a number representative of the position of the sensor element 1 in the measurement direction.

The sensor element 1 includes a printed circuit board 13 having conductive tracks printed thereon which form a first resonant circuit 15a and a second resonant circuit 15b which are spaced from each other in the measurement direction. By applying an excitation signal to the sine coil 3, resonant signals are induced in the two resonant circuits 15a, 15b on the sensor element 1, and these resonant signals in turn induce a signal in the sense coil 7 which is processed by the control unit 9 to determine the position of the sensor element 1 along the measurement direction.

As shown in FIG. 1, the PCB 3 is generally rectangular in shape with the lengthwise axis aligned with the measurement direction and the widthwise axis aligned perpendicular to the measurement direction. The sine coil 5 and the sense coil 7 are connected to the control unit 9 via a proximal lengthwise edge 17 of the PCB 3, and extend along the length of the PCB 3 to a distal lengthwise edge 19.

An overview of the operation of the position sensor illustrated in FIG. 1 will now be given with reference to FIG. 2. The control unit 9 includes an excitation signal generator 21 which generates an oscillating excitation signal having a frequency $f_0$, which in this embodiment is 1 MHz.

The excitation signal is applied to the sine coil 5 via the proximal lengthwise edge 17 of the PCB 3, which substantially corresponds to a position value of x=0. The position value increases along the length of the PCB 3 from the proximal lengthwise edge 17 to the distal lengthwise edge 19, which substantially corresponds to a position value of x=L.

Figure 2:
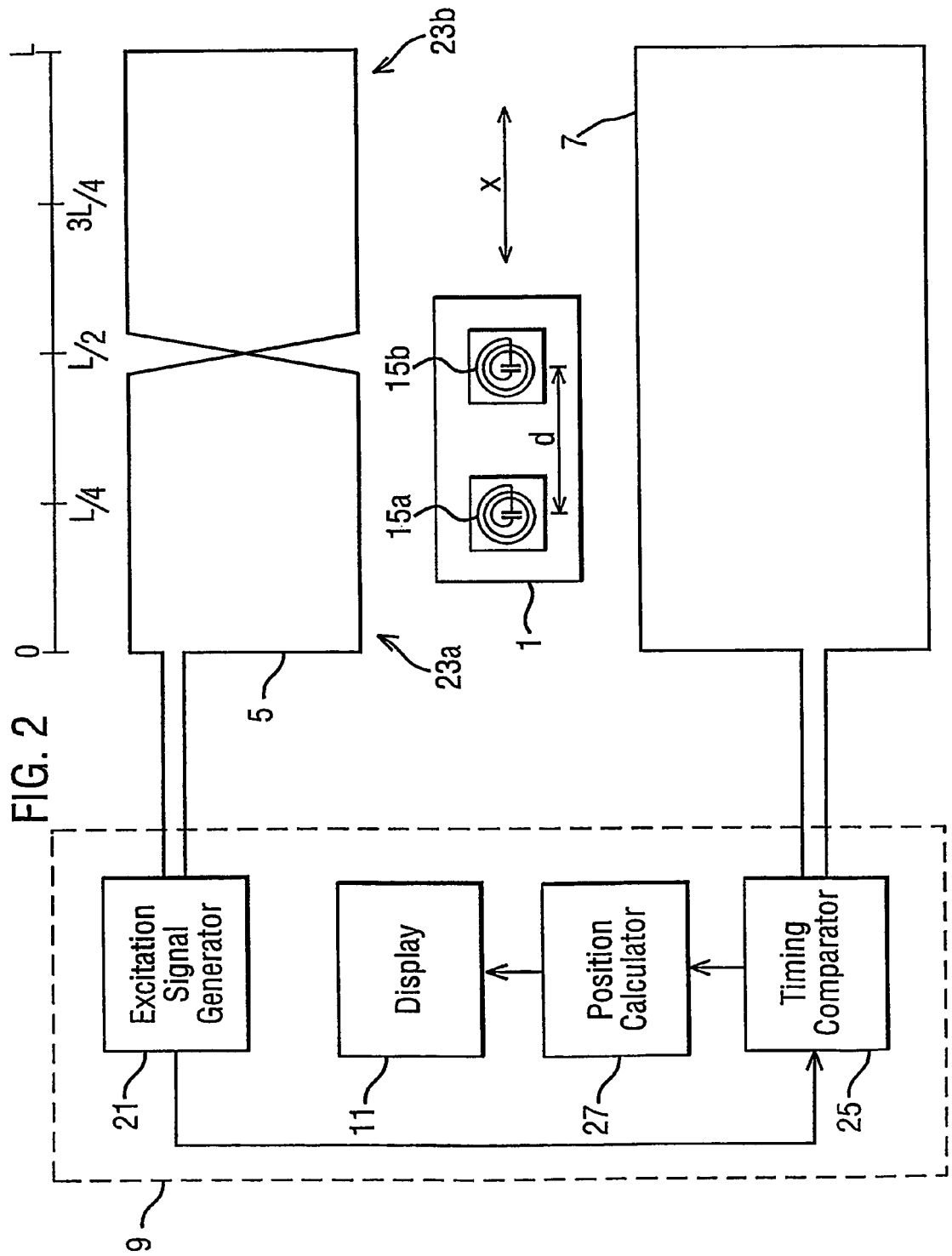

As shown in FIG. 2, the sine coil 5 is formed by a conductive track which generally extends around the periphery of the PCB 3 apart from a cross-over point halfway along the PCB 3 in the measurement direction, at which point the conductive track adjacent each widthwise edge of the PCB 3 crosses to the respective opposing widthwise edge of the PCB 3. In this way, effectively a first current loop 23a and a second current loop 23b are formed. When a signal is applied to the sine coil 5, current flows around the first current loop 23a and the second current loop 23b in opposite directions, and therefore the current flowing around the first current loop 23a generates a magnetic field which has an opposite polarity to the magnetic field generated by the current flow around the second current loop 23b.

The lay-out of the sine coil 5 is such that the field strength of the component of the magnetic field B resolved perpendicular to the PCB 3 which is generated by current flowing through the sine coil 5 varies along the measurement direction from approximately zero at the point where x=0, then to a maximum value at x=L/4 (the position A as shown in FIG. 1), then back to zero at x=L/2 (the position B as shown in FIG. 1), then to a maximum value (having opposite polarity to the maximum at position A) at x=3L/4, and then back to zero at x=L. In particular, the sine coil 5 generates a magnetic field component B perpendicular to the PCB 3 which varies according to one period of the sine function, as set out in Equation 1, $$B = A \sin\left(\frac{2\pi x}{L}\right) \quad (1)$$

where A is a constant.

Figure 3:
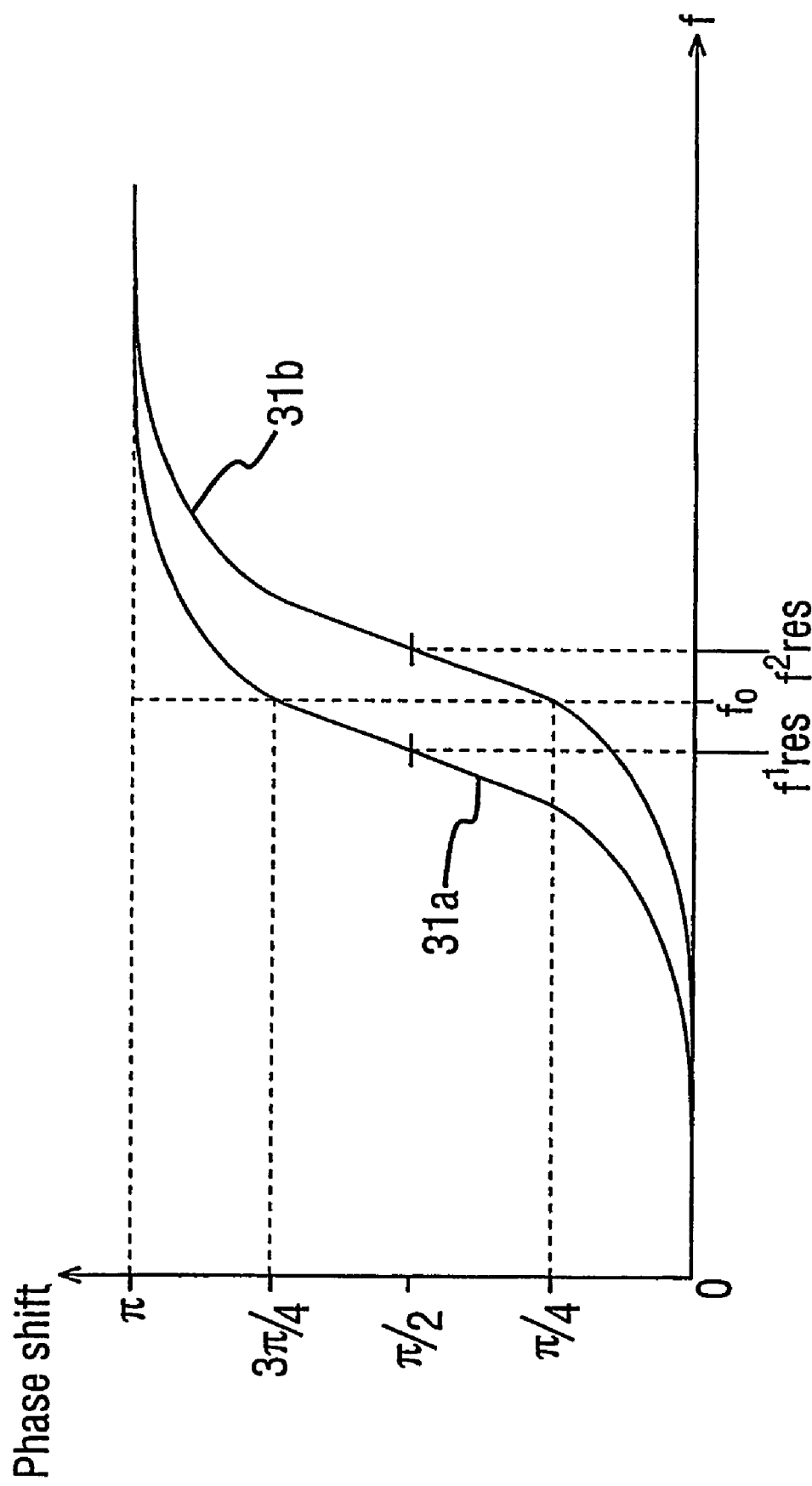

When the excitation signal is applied to the sine coil 5, an oscillating signal at the same frequency is induced in each of the two resonant circuits 15a, 15b on the sensor element 1, with the magnitude of the induced signal in each resonant circuit 15 being dependent upon the strength of the magnetic field component B resolved perpendicular to the PCB 3 at the respective position of the resonant circuit 15 along the measurement direction. In this embodiment, the first resonant circuit 15a is separated from the second resonant circuit 15b by a distance d which is equal to L/4, so that as the sensor element 1 moves along the measurement direction the magnitude of the resonant signals induced in the first and second resonant circuits 15 vary in quadrature. A phase lag is also introduced between the excitation signal and the induced signal in each resonant circuit, the amount of the phase lag being dependent upon the relationship between the frequency of the excitation signal and the resonant frequency of each resonant circuit 15. FIG. 3 shows the variation in phase lag with the frequency of the excitation signal for the first and second resonant circuits 15a, 15b. In particular, the curve referenced 31a shows the variation in phase lag with the frequency of the excitation signal for the first resonant circuit 15a, and the curve referenced 31b shows the variation in phase lag with the frequency of the excitation signal for the second resonant circuit 15b.

As shown in FIG. 3, the resonant frequency $f^1_{res}$ of the first resonant circuit 15a is set so that at the frequency $f_0$ of the excitation signal, the phase lag of the induced signal in the first resonant circuit is $3\Pi/4$, whereas the resonant frequency $f^2_{res}$ of the second resonant circuit 15b is set so that at the frequency $f_0$ of the excitation signal, the phase lag of the signal induced in the second resonant circuit is $\Pi/4$. If the position of the first resonant circuit 15a along the measurement direction is $X_0$, then the signals $I_1$, $I_2$ induced in the first and second resonant circuits 15a, 15b are given by equations 2 and 3 respectively.

$$I_1 = B\sin\left(\frac{2\pi X_0}{L}\right)\cos\left(2\pi f_0 t - \frac{3\pi}{4}\right) \quad (2)$$

$$I_2 = B\sin\left(\frac{2\pi\left(X_0 + \frac{L}{4}\right)}{L}\right)\cos\left(2\pi f_0 t - \frac{\pi}{4}\right) \quad (3)$$

where B is a constant.

The induced signals $I_1$, $I_2$ in turn induce a signal S in the sense coil 7 proportional to the sum of the induced signals $I_1$ and $I_2$. This sum simplifies to the expression given in Equation 4, in which C is a constant.

$$S = C\cos\left(\frac{2\pi X_0}{L} - 2\pi f_0 t + \frac{\pi}{4}\right) \quad (4)$$

In effect, the phase of the signal S rotates as the sensor element 1 moves along the measurement direction.

As shown in FIG. 2, the signal S is input to a timing comparator 25 which compares the timing of the signal S with the timing of a reference signal from the excitation signal generator 21 to determine a value representative of the phase of the signal S. This value is then input to a position calculator 27, which converts the value to a position value for the sensor element 1, and outputs a drive signal to the display 11 causing the display 11 to show the position value.

Figure 4:
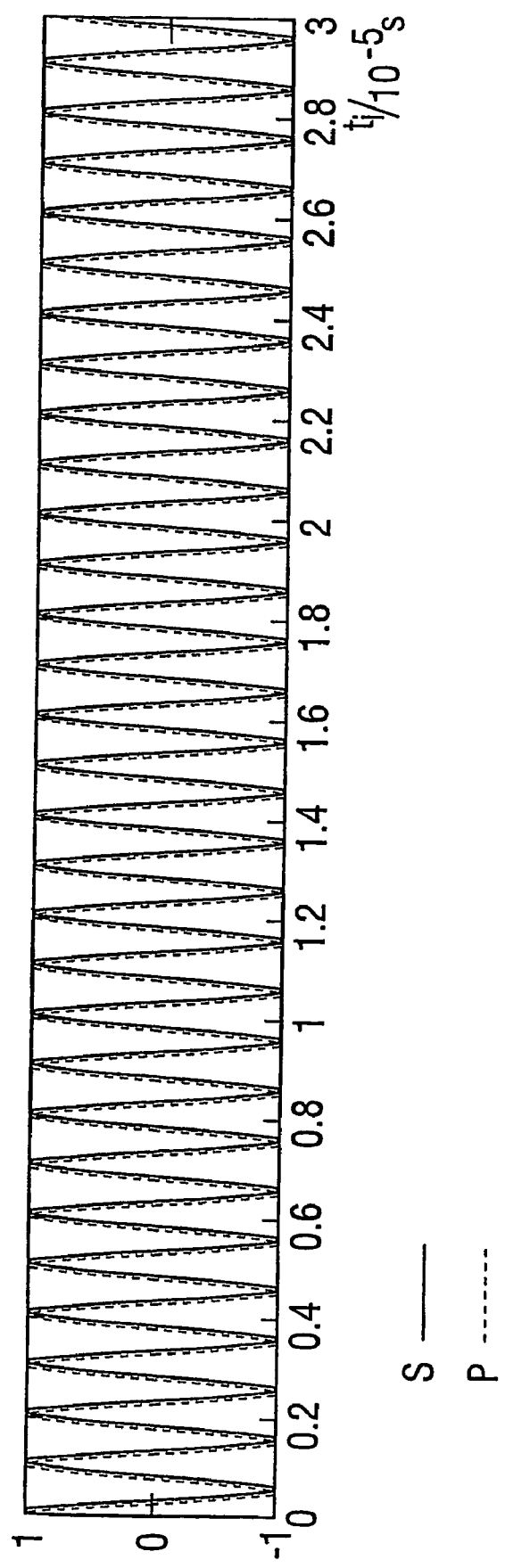
FIG. 4 shows an unmodulated signal and a sensed signal generated by the sensor illustrated in FIG. 1.
Figure 5:
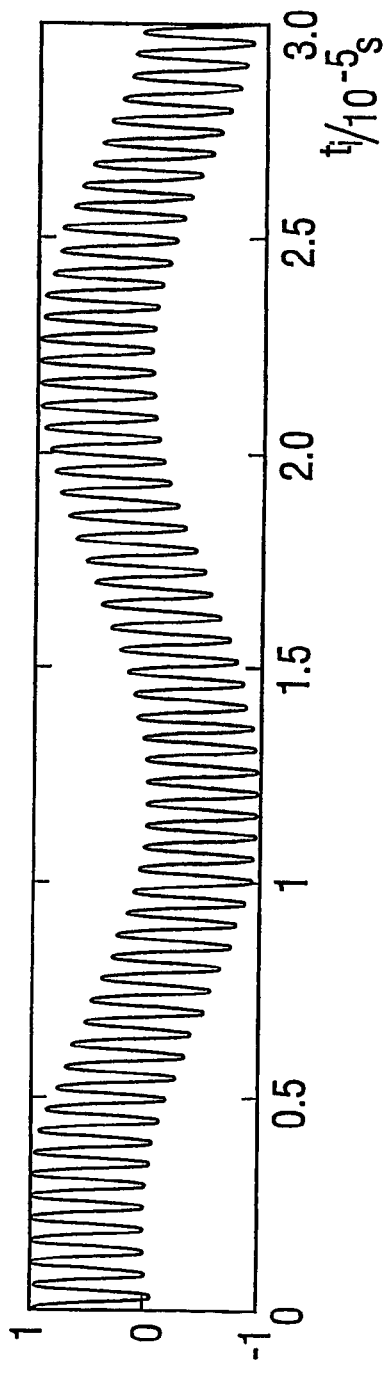
FIG. 5 shows part of a signal that is sensed by a sensor winding, which forms part of the position sensor illustrated in FIG. 1, after mixing with a second frequency.
Figure 6:
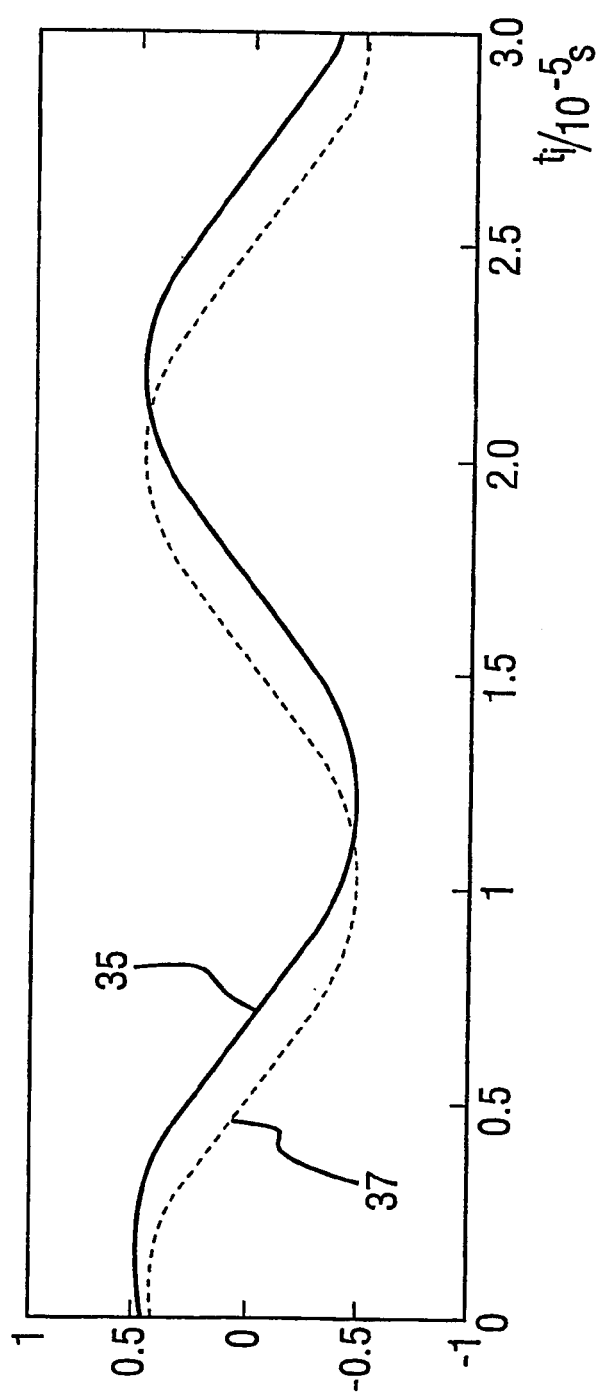
FIG. 6 shows part of the signal illustrated in FIG. 5 after filtering, together with a reference signal.

As mentioned above, in this embodiment the frequency $f_0$ of the oscillating excitation signal is 1 MHz. This frequency is sufficiently high to induce a relatively large signal in each resonant circuit 15. FIG. 4 shows the excitation signal P together with the signal S which is induced in the sense coil 7. In FIG. 6, the sense signal S has a phase delay of 0.1 μs with respect to the excitation signal P. At a frequency of 1 MHz, the phase delay will always be 1 μs or less, with the result that, in order to determine the position of the sensor element accurately, it is necessary to resolve the phase delay to a value of 1 to 10 ns, which is relatively difficult. If, however, the sensed signal S is mixed with a second signal of slightly lower or higher frequency, a signal as shown in FIG. 5 is generated which contains a signal at a frequency higher than the original signal, together with a lower frequency "beat" signal at a frequency equal to the frequency difference between the sensed signal and the second signal. This signal can be filtered to remove the high frequency signal and other signals and leave the beat sinusoidal signal 35 as shown in FIG. 6. The beat signal 35 has a phase delay that is related to the position of the sensor element 1 so that it may be compared with a reference signal 37 of the same frequency to determine the position of the sensor element 1. It can be seen from FIG. 6 that the phase delay of the resulting beat signal corresponds to much longer times with the result that relatively inexpensive circuitry can be employed to measure the phase delay.

Figure 7:
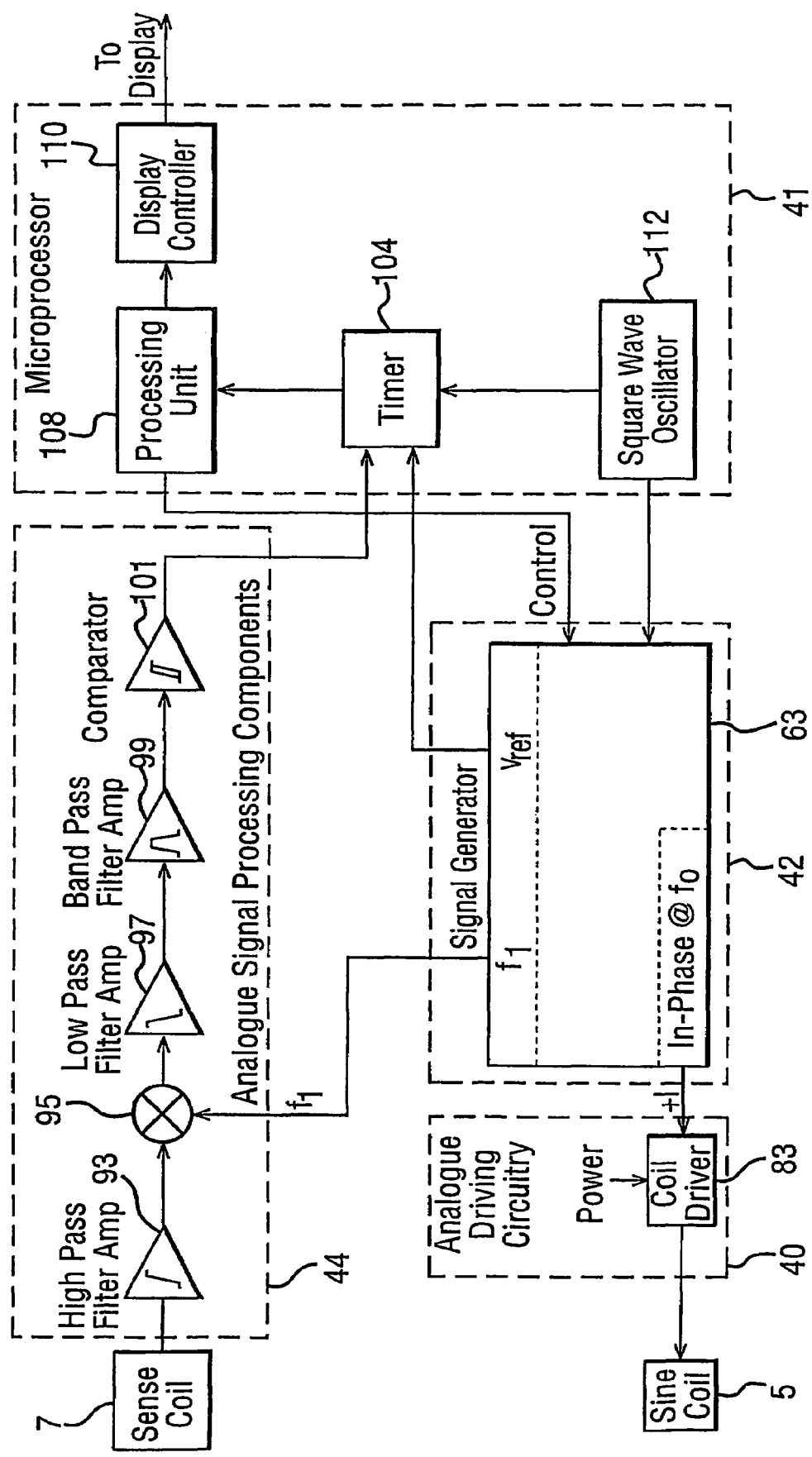
FIG. 7 is a schematic block diagram showing the main elements of the position sensor illustrated in FIG. 1.

FIG. 7 schematically shows the circuitry within the control unit 9 in more detail, together with the sine coil 5 and sense coil 7. The circuitry within the control unit 9 comprises a microprocessor 41, signal generator 42, analogue driving circuitry 40 and analogue signal processing components 44.

The microprocessor 41 includes a square wave oscillator 112 which generates a square wave signal at twice the frequency $f_0$ (i.e. at 2 MHz). This square wave signal is output from the microprocessor 41 to the signal generator 42 which divides the square wave signal by two and forms an in-phase digital signal +I at the frequency $f_0$. The in-phase signal +I is sent to the analogue driving circuitry 40, and is input to a coil driver 83 which amplifies the signal and outputs the excitation signal to the sine coil 5.

The digital generation of the excitation signals applied to the sine coil 5 introduces high frequency harmonic noise. However, the coil driver 83 removes some of this high frequency harmonic noise, as does the frequency response characteristics of the sine coil 5. Further, the resonant circuits 15 within the sensor element 1 do not respond to signals which are greatly above their respective resonant frequencies and therefore the resonant circuits 15 also filter out a portion of the unwanted high frequency harmonic noise.

The signal S induced in the sense coil 7 is passed through a high pass filter amplifier 93 which both amplifies the received signal, and removes low frequency noise (e.g. from a 50 Hz mains electricity supply) and any D.C. offset. The amplified signal is then input to a mixer 95, where the amplified signal is mixed with a reference signal at a second frequency $f_1$. The second signal of frequency $f_1$ is a digital signal having sinusoidal characteristics, and is generated by the signal generator 42. The second signal has a fundamental frequency somewhat higher or lower than that of the original signals at frequency at $f_0$ so that the signal output by the mixer 95 includes components at frequencies $f_0+f_1$ and at $f_0-f_1$. This mixed signal is then input to a low pass amplifier filter 97 to filter out the high frequency components, i.e. those components at a frequency of $f_0+f_1$.

The second signal typically has a frequency $f_1$ that differs from $f_0$ by not more than 10% of the original frequency $f_0$ so that the components of the resulting signal have a frequency $f_0-f_1$ which is at a much lower frequency than any other component of the signal and the higher frequency components can therefore easily be removed by means of an analogue filter. The filtered signal is then input to a band pass filter amplifier 99 having a pass band centered at $f_0-f_1$, after which a generally sinusoidal third signal is formed as shown in FIG. 6.

The signal output by the band pass filter amplifier 99 is input to a comparator 101 which converts it to a square wave signal whose rising and falling edges correspond with the zero crossing points of the sinusoidal signal of FIG. 6. The square wave signal is input into a timer 104, forming part of the microprocessor 41, together with another square wave signal $V_{ref}$ generated by the signal generator 42, of the same frequency which provides a reference phase.

The timer measures the difference between the timings of the rising and falling edges of the signal output by the comparator 101 and the reference signal $V_{ref}$ and outputs the measured timings to a processing unit 108 which determines the corresponding position value using a look-up table. The processing unit 108 then outputs the determined position value to a display controller 110 which generates drive signals to cause the display 11 to show the determined position value.

Further details of the components and operation of the control unit 9 may be found in UK patent application no. 0224100.8, whose contents are hereby incorporated by reference.

MODIFICATIONS AND FURTHER EMBODIMENTS

In the illustrated embodiment, an excitation winding (i.e. the sine coil 5) is electromagnetically coupled to two resonators (i.e. the resonant circuits 15), and the resonant signals induced in the resonant circuits 15 are analysed using a sensor winding (i.e. the sense coil 7) which is electromagnetically coupled with the two resonators. It is not essential to use such a sensor winding because the resonant signals induced in the two resonators could be measured directly. Such direct measurement is not, however, preferred because it would require electrical connections to be made to the sensor element.

In the illustrated embodiment, the resonant circuits 15 on the sensor element 1 have overlapping, but not identical, ranges of frequencies over which a sinusoidal signal applied to the sine coil 5 induces a resonant signal in the sense coil 7. The frequency of the excitation signal is selected so that there is a quarter of a cycle phase difference between the signals induced in the first and second resonant circuits caused by the phase shifts which are inherent to resonators around the resonant frequency.

In the illustrated embodiment, the sensor element includes two resonant circuits 15 which are separated by a distance corresponding to a quarter of a cycle of the sine coil 5. This is not, however, essential as the sensor element could, for example, have two resonant circuits separated by three-quarters of a cycle of the sine coil 5. Alternatively, the sensor element could have three or more spaced resonant circuits.

In the illustrated embodiment, the sine coil 7 is arranged so that the magnetic field component perpendicular to the PCB 3 varies sinusoidally in accordance with position along the measurement direction, and the two resonant circuits are separated by a distance of L/4 along the measurement direction. In this way, the electromagnetic coupling between the sine coil 5 and the first resonant circuit 15a varies in accordance with a first function (i.e. the sine function) and the electromagnetic coupling between the sine coil 5 and the second resonant circuit 15b varies in accordance with a second function (i.e. the cosine function). In order to achieve this, the sine coil has an alternate twisted loop structure. However, it would be apparent to a person skilled in the art that an enormous variety of different excitation winding geometries could be employed to form transmit aerials which achieve the objective of causing the relative strengths of the resonant signals appearing in the first and second resonant circuits to depend upon the position of the sensor element in the measurement direction according to respective first and second functions.

In the above described embodiment, a passive resonator is used. However, in some circumstances it may be advantageous to use a resonator including an amplifier so that the signal induced in the resonator is increased.

In the illustrated embodiment, instead of detecting the phase of the sense signal, it is also possible to perform parallel synchronous detection of the sense signal, with one synchronous detection using an in-phase signal (with respect to the excitation signal) and the other synchronous detection using a quadrature signal (with respect to the excitation signal). By then performing an arctangent operation on the ratio of the magnitudes of the synchronously detected signals, a value representative of the position of the sensor element 1 in the measurement direction can be obtained.

In the described embodiment, the inductive sensor is used to measure the linear position of a first member (i.e. the sensor element 1) relative to a second member (i.e. the PCB 3) along a rectilinear measurement path.

Alternatively, the inductive sensor could be adapted to measure linear position along a curved measurement path, for example a circle (i.e. a rotary position sensor), by varying the layout of the sine coil in a manner which would be apparent to a person skilled in the art. The inductive sensor could also be used as a speed detector by taking a series of measurements of the position of the first member relative to the second member at known timings.

In the illustrated embodiment, the sine coil, sense coil and resonant circuits are formed by conductive tracks on a printed circuit board. Alternatively, a different planar substrate could be used. Further, the sine coil and sense coil could, if sufficiently rigid, be fixed relative to a first member and the resonant circuits fixed relative to a second member without the use of a substrate. It is also not essential that the sine coil, sense coil and resonant circuits are planar because, for example, cylindrical windings could also be used with the sensor element moving along the cylindrical axis of the cylindrical winding.

Of course, as the position sensor detects the relative position between first and second members, it does not matter which of the first member and the second member are moved, or even if both are moved.

In the above described embodiment, the excitation signal is a digital representation of a sinusoidal signal. This is not essential and may be convenient to use an excitation signal which is more easily generated. For example, the excitation signal could be a digital representation of a triangular waveform. The phase of the sensed signal can be decoded in the same way as the illustrated embodiment by only looking at the fundamental frequency of the sensed signal, i.e. by filtering out the higher harmonics present in the triangular waveform. As described previously, the frequency responses of the analogue driving circuitry, the sine coil and the resonant circuits are effective in removing a large proportion of the higher harmonics.

The invention claimed is:

1. A position sensor comprising:
   first and second members which are movable relative to each other along a measurement path, the first member comprising an excitation winding and the second member comprising first and second resonators spaced apart along the measurement path;
   an excitation signal generator operable to generate an excitation signal and to apply the excitation signal to the excitation winding to induce a first resonant signal in the first resonator and a second resonant signal in the second resonator; and
   an analyser operable to analyse the first and second resonant signals to determine a value representative of the relative position along the measurement path of the first and second members, the analyser operable to measure a phase of a signal formed by a weighted combination of the first and second resonant signals;
   wherein the analyser is operable to generate a second signal at a frequency different from that of the excitation signal, and to mix the second signal with the signal formed by a weighted combination of the first and second resonant signals to generate a third signal having a frequency component equal to the difference between the frequency of the excitation signal and that of the second signal, and to determine the said value from the phase of the third signal;
   wherein the excitation winding and the first resonator have a first electromagnetic coupling which varies with the relative position along the measurement path of the first and second members in accordance with a first function, and the excitation winding and the second resonator have a second electromagnetic coupling which varies with said relative position in accordance with a second function different from the first function, and wherein the first resonator is operable to introduce a first phase shift into the first resonant signal and the second resonator is operable to introduce a second phase shift, which is different from the first phase shift by one quarter of a cycle, into the second resonant signal.

2. The position sensor according to claim 1, wherein the first and second members are relatively movable along a rectilinear direction.

3. The position sensor according to claim 1, wherein the excitation winding is formed by a conductive track on a planar substrate.

4. The position sensor according to claim 3, wherein the planar substrate is a printed circuit board.

5. The position sensor according to claim 3, wherein the excitation winding effectively comprises a plurality of loops arranged so that current flowing through the excitation winding flows around at least one of the loops in an opposite direction to at least one other of the loops.

6. The position sensor according to claim 1, wherein at least one of said first and second resonators comprises a passive resonant circuit.

7. The position sensor according to claim 1, wherein at least one of said first and second resonators comprises an amplifier for amplifying the power of a signal induced in the resonator.

8. The position sensor according to claim 1, wherein the first and second resonators comprise respective conductive tracks formed on a planar substrate.

9. The position sensor according to claim 8, wherein the planar substrate is a printed circuit board.

10. The position sensor according to claim 1, wherein the excitation signal comprises a sinusoidal component at 1 MHz.

11. The position sensor of claim 1, where the first resonator exhibits resonance in response to a first range of frequencies about a first resonant frequency and the second resonator exhibits resonance in response to a second range of frequencies about a second resonant frequency which is different from the first resonant frequency, the first and second ranges overlapping,
   wherein the excitation generator is operable to generate an excitation signal having a frequency component which induces the first and second resonant signals in the first and second resonators respectively.

* * * * *